United States Patent [19]

Harttig et al.

[11] Patent Number: 4,812,269

[45] Date of Patent: Mar. 14, 1989

[54] PROCESS FOR PRODUCING HOLLOW FIBER SEMI-PERMEABLE MEMBRANES

[75] Inventors: Erich H. Harttig, Hechingen; Reinhold J. Buck, Alleshausen; Hermann J. Gohl, Bisingen-Zimmern, all of Fed. Rep. of Germany

[73] Assignee: Gambro Dialysatoren KG, Sweden

[21] Appl. No.: 83,900

[22] Filed: Aug. 6, 1987

Related U.S. Application Data

[63] Continuation of Ser. No. 826,561, Feb. 6, 1986, abandoned.

[30] Foreign Application Priority Data

Mar. 7, 1985 [SE] Sweden .................... 8501111

[51] Int. Cl.$^4$ .................... D01D 5/24; D01F 6/28
[52] U.S. Cl. .................... 264/41; 264/83; 264/561; 264/562; 264/182; 264/184; 264/185; 264/205; 264/206; 264/209.1; 264/211.15; 264/211.16; 264/234; 264/345; 264/186; 210/500.23; 210/500.27
[58] Field of Search .................... 264/41, 83, 182, 184, 264/209.1, 205, 211.14, 561, 562, 185, 206, 211.15, 211.16, 234, 345, 186; 210/500.23, 500.27; 524/909; 521/905

[56] References Cited

U.S. PATENT DOCUMENTS

| | | | |
|---|---|---|---|
| 3,728,255 | 12/1975 | Mrilkovich et al. | 521/905 |
| 3,950,257 | 4/1976 | Ishii et al. | 524/909 |
| 4,051,300 | 9/1977 | Klein et al. | 264/49 |
| 4,100,238 | 7/1978 | Shinomura | 264/49 |
| 4,439,322 | 3/1984 | Soroda et al. | 264/41 |
| 4,535,028 | 8/1985 | Yokoji et al. | 210/500.23 |
| 4,705,632 | 11/1987 | Yojita et al. | 210/500.23 |
| 4,749,619 | 6/1988 | Harttig et al. | 210/500.23 |

FOREIGN PATENT DOCUMENTS

| | | |
|---|---|---|
| 0006030 | 12/1979 | European Pat. Off. . |
| 0046817 | 3/1982 | European Pat. Off. . |
| 0076442 | 4/1983 | European Pat. Off. . |
| 0077098 | 4/1983 | European Pat. Off. . |
| 4214196 | 8/1967 | Japan .................... 521/905 |
| 54-55623 | 2/1979 | Japan . |
| 55-106243 | 8/1980 | Japan . |
| 2031792 | 4/1980 | United Kingdom . |
| 2047161 | 11/1980 | United Kingdom . |

*Primary Examiner*—Jan H. Silbaugh
*Assistant Examiner*—Hurbert C. Lorin
*Attorney, Agent, or Firm*—Lerner, David, Littenberg, Krumholz & Mentlik

[57] ABSTRACT

Processes for producing semipermeable membranes in the form of hollow fibers are disclosed including extruding a solution of a block copolymer including at least one hydrophilic polymer and at least one hydrophobic polymer while simultaneously injecting a gaseous or vaporous center medium into the center bore of the hollow fiber extrudate, including coagulating the extrudate so formed therefrom. The preferred process includes using air or the components of air as the center medium and employing a polyethyleneoxide-polycarbonate block copolymer to form the hollow fiber membranes.

6 Claims, No Drawings

PROCESS FOR PRODUCING HOLLOW FIBER SEMI-PERMEABLE MEMBRANES

This is a continuation of application Ser. No. 826,561 filed Feb. 6, 1986, now abandoned.

FIELD OF THE INVENTION

The present invention relates to processes for spinning semipermeable hollow fiber membrane. More particularly, the present invention relates to processes for producing hollow fiber membranes having an inner surface with a higher degree of hydrophilicity.

BACKGROUND OF THE INVENTION

Hollow fiber semipermeable membranes are presently being used extensively in a wide range of diffusive and/or convective separation processes. More particularly the hollow fiber membranes to which the present invention is particularly directed are used, although not exclusively, to quite a considerable extent in connection with the extracorporeal treatment of blood, such as in hemofiltration, hemodialysis and the like.

It is well known to produce hollow fiber membranes by a technique which includes the coextrusion of a polymer dissolved in a suitable solvent or solvent system along with a fluid which may be inert, or which may act as a coagulation or precipitation fluid. In these techniques, the polymer solution is generally extruded through a circular orifice, and the inert fluid or coagulating or precipitating fluid is extruded out of a central bore within the center of the circular slit through which the polymer is being extruded. This fluid is thus called the center fluid or center medium. It is also common practice to then allow the coextrudate to pass through the atmosphere for a short time, generally ranging from fractions of a second up to several seconds, and in many cases the length of that air gap is said to influence the properties of the resulting hollow fiber membrane. Further, it is also common in these processes to draw the coextrudate through various fluids which may be, but are not necessarily, identical with the center fluid. The center fluid and/or these consecutive treatment fluids cause a phase inversion, and finally precipitation and solidification of the membrane. These processes are thus decisive of the various membrane properties, such as those of the pore structure, pore size, pore size distribution, wettability, burst pressure, permeability and rejection properties, etc. thereof.

One property of such hollow fiber membranes which is of extreme importance, particularly in connection with the use of such hollow fiber membranes in medical applications, is the surface energy. The surface energy of a polymer depends on the nature of those groups which are present on its surface. In the case of blood contact, it is well known that a surface which has a high surface energy tends to exhibit a lower tendency to adsorb proteins or cellular components that may cause coagulation, as compared to such surfaces which have low surface energies. Furthermore, these surface energies correspond to the wettability of these surfaces. That is, the higher the surface energy of such a surface, the better will be its wettability. Water is generally employed as the wetting agent. Thus, the lower the contact angle with water, the higher is both the wettability and the surface energy thereof.

Membranes which have highly wettable surfaces will also tend to have high diffusive permeabilities, and therefore to have higher clearances when used in dialysis processes and the like. An object of this invention is therefore to provide a process for producing hollow fiber membranes with an inner fiber surface having improved wettability characteristics, which in turn leads to higher performance and reduced fouling thereof.

It is also a common technique to collect these hollow fiber membranes into bundles, and to then pot them into suitable housings. The most widely used material is two component polyurethane, and for potting these bundles of membranes into this type of potting material it is essential to first bring the hollow fiber membranes into a dry state. Therefore, these hollow fiber membranes must be stabilized against irreversible shrinkage and loss of filtration properties during drying. This is commonly done with glycerol, especially with membranes intended for medical use, as is disclosed, for example, in European Patent Publication No. 0 046 817.

The most common technique presently being employed requires a series of discontinuous production steps between precipitation of the hollow fiber membrane and the preparation of a bundle which is ready to be potted. In particular, the hollow fiber membranes must be collected, made into bundles, the center fluid has to be removed, the hollow fiber membranes must be rinsed, treated with a stabilizing agent against shrinkage and loss of properties during drying, excess stabilizing agent must be removed, and the bundle of hollow fiber membranes must then be dried in order to be ready for potting.

There is obviously significant interest in finding a production procedure which avoids the use of expensive rinsing procedures and which reduces the need to rely on these discontinuous production steps. Another object of this invention is therefore to provide a process for producing such dry, hollow fiber membrane bundles which are ready for potting on line.

SUMMARY OF THE INVENTION

In accordance with the present invention, these and other objects have now been accomplished by applicants' discovery of a process for producing semipermeable hollow fiber membranes which comprises extruding a solution of a block copolymer including at least one hydrophylic polymer and at least one hydrophobic polymer so as to produce an extrudate in the form of a hollow fiber, simultaneously injecting a center medium into the center bore of said hollow fiber extrudate, said center medium being selected from the group consisting of gases, vapors and mixtures thereof, and coagulating said hollow fiber extrudate.

In accordance with a preferred embodiment of the process of the present invention, the center medium is preferably air or a component of air.

In accordance with another embodiment of the process of the present invention, the process includes extruding said solution directly into a coagulating fluid.

In accordance with another embodiment of the process of the present invention, the process includes drying the coagulated hollow fiber extrudate.

In accordance with a preferred embodiment of the process of the present invention, the polymer is preferably chosen from block copolymers comprising at least one hydrophilic polymer block and at least one hydrophobic polymer block, and the block copolymers may be binary, tertiary or quartenary block copolymers.

DETAILED DESCRIPTION

The block copolymers from which the hollow fiber membranes of the present invention are produced may be chosen from a series of block copolymers having the following schematic structure;

—(A—B)$_n$— where A is a block of variable length of a hydrophilic or water soluble polymer, and B is a block of variable length of a hydrophobic polymer, and where n is an integer from 1 to about 1000.

Suitable block copolymers may also be chosen from among a series of block copolymers having the following schematic structure;

—(A—B—C—D)$_n$— in which A, B, C, and D may or may not be identical, but in which at least one of them is a block of variable length of a hydrophilic or water soluble polymer and at least one of them is a block of variable length of a hydrophobic polymer, and in which n is an integer from 1 to about 1000.

The hydrophobic polymer blocks can include such polymers as polyvinylchloride, polyacrylonitrile, polyethylene, polypropylene, polytetrafluorethylene, polyvinylidene-fluoride, polymethylmethacrylate, polycarbonate, polystyrene, polyphenylene, polysulfone, polyimide, polyetherimide and polysiloxane.

The hydrophilic polymer blocks can include such polymers as polyvinylpyrrolidone, polyhydroxymethylmethacrylate, polymethacrylic acid, polyethyleneoxide, polyvinylalcohol, polysaccharide and polyimine.

A particular copolymer which is of special interest is a polyethyleneoxide-polycarbonate-copolymer. This material is particularly useful for making such membranes for use in diffusive and filtrative operation processes.

In the case of polymers that contain polar and apolar groups, the process for their production has an effect upon the surface energy thereof. For example, it is reported by Mayrhofer and Sell (Angew. makromol. Chem. 20 (1971) 153) that different types of polyesters solidified against mica show contact angles with water that are 8 to 16 degrees lower than is the case with similar polyesters solidified against air. This generally results in a minimization of the interfacial energy.

Therefore, it was very surprising indeed to have found an increased wettability of the inner surface of a hollow fiber membrane made from the block copolymers of the present invention such as polyethyleneoxide-polycarbonate-copolymers when nonpolar nitrogen gas was used instead of the polar center fluid water. The processes according to the present invention can also be carried out with other gases or vapors, preferably of low boiling liquids, or with mixtures of different gases or of different vapors, or with mixtures of gases and vapors.

The structure of the membranes produced according to this invention are homogeneous, without a skin on their inside or on their outside. In producing hollow fiber membranes according to the present invention, having a constant wall thickness, no change in structure and diffusion and filtration properties could be seen when the diameter of the circular slit of the orifice was changed, or when the spinning speed was changed, or when the circular stretch of the membrane in the state of precipitation was changed, or when the temperature of the first coagulation bath was varied between 0° and 45° C.

Besides the highly advantageous improved wettability, the process of the invention is characterized by an improved technique for preparing a dry bundle of hollow fiber membranes ready for potting.

It has thus been found that the speed and rate of solvent removal is increased thereby. Furthermore, uptake of stabilizing agent can be carried out on line, as can the drying also, and without loss of the filtrative and diffusive properties thereof.

The invention will be further illustrated by the following examples:

EXAMPLE 1

A solution as prepared containing 14% by weight of polyethyleneoxide-polycarbonate-copolymer with a ratio of polyethylene-oxide to polycarbonate of 20:80, and 86% by weight of 1.3-Dioxolane with a viscosity of 19,757 cP. The solution was extruded through a circular slit orifice. The center bore of the orifice was connected to a nitrogen pressure reducer with a constant pressure of 65 mm Hg. The orifice was immersed into water at 40° C., and at a depth of 770 mm. The fiber was drawn through a number of baths to remove the dioxane. The resultant hollow fiber membrane had an inner diameter of 250 μm and a constant wall thickness of 16 μm.

After additional washing with distilled water for 16 hours, the advancing contact angle $\theta_a$ of the inner surface was measured against water. This was done by observation of a very slowly moving air bubble in the water-filled, hollow fiber membrane at 20° C. immersed in water.

For purposes of comparison, the advancing contact angles $\theta_a$ of water against the inner surface of a conventional spun polyethyleneoxide-polycarbonate-copolymer hollow fiber membrane and of a cuprophane hollow fiber membrane, each with water as the center medium, also was measured.

The following results were obtained:

TABLE 1

|  | n | $\theta_a$ (deg) |
|---|---|---|
| PEC with nitrogen as center | 10 | 30.4 ± 1.7 |
| PEC with water as center | 10 | 50.8 ± 2.5 |
| Cuprophane | 10 | 17.5 ± 3.3 |

EXAMPLE 2

Additional hollow fiber membranes were spun as described in Example 1, and collected into bundles. These bundles were treated in a solution containing 40% by weight of glycerol and 60% by weight of water, dried and potted with polyurethane in dialyzer housings. The resulting polyethyleneoxide-polycarbonate-hollow fiber dialyzers had the properties listed in Table 2 below:

TABLE 2

| Acitve area (m$^2$) | 1.0 |
|---|---|
| UF in vitro (ml/h) | 746 |
| Clearance in vitro (ml/min) Chloride | 176 |
| $Q_B$ = 200 ml/min | |

TABLE 2-continued $Q_D$ = 500 ml/min

EXAMPLE 3

Additional hollow fiber membranes were spun as described in Example 1. In this case, however, before the fibers were collected into bundles, they ran through a bath with a stabilizing fluid according to Example 2. The treatment time was 12 seconds at 22° C. The bundles were then dried and potted with polyurethane into dialyzer housings. The resulting polyethyleneoxide-polycarbonate-hollow fiber dialyzers had the properties listed in Table 3 below:

TABLE 3

| Acitve area (m²) | 1.0 |
|---|---|
| UF in vitro (ml/h) | 668 |
| Clearance in vitro (ml/min) Chloride | 174 |
| $Q_B$ = 200 ml/min | |
| $Q_D$ = 500 ml/min | |

EXAMPLE 4

Additional hollow fiber membranes were spun according to Example 3. Before collecting these hollow fiber membranes into bundles, the hollow fibers were dried in an air channel at 40° C. The drying time was 23 seconds. The bundles were then potted with polyurethane in dialyzer housings.

The resulting polyethyleneoxide-polycarbonate dialyzers had the properties listed in Table 4 below:

TABLE 4

| Active area (m²) | 1.0 |
|---|---|
| UF in vitro (ml/h) | 668 |
| Clearance in vitro (ml/min) Chloride | 175 |
| $Q_B$ = 200 ml/min | |
| $Q_D$ = 500 ml/min | |

Hollow fiber membranes from such a bundle were rinsed for 16 hours with distilled water, and the advancing contact angle against water in the interior of the fibers was measured according to the method of Example 1. The result was: $\theta_a = 28.9 \pm 3.1$ (deg).

The process according to the present invention can be used to produce dry semipermeable hollow fiber membranes having interiors with improved wettability for any diffusive and/or convective separation processes in an on-line process.

The present process is, however, particularly, though not exclusively, useful in connection with semipermeable hollow fiber membranes for use in the extracorporeal treatment of blood, such as in hemodialysis, hemodiafiltration, hemofiltration, and the like.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

We claim:

1. A process for producing a homogeneous semipermeable hollow fiber membrane with an inner fiber surface having improved wettability characteristics comprising extruding a solution of a block copolymer including at least one hydrophilic polymer and at least one hydrophobic polymer so as to produce an extrudate of said block copolymer in the form of a hollow fiber having an inner surface, simultaneously injecting a center medium into the center bore of said hollow fiber extrudate, said center medium comprising a non-polar center medium selected from the group consisting of gases, vapors and mixtures thereof, whereby said center medium causes an increase in the wettability of said inner surface of said hollow fiber, and coagulating said hollow fiber extrudate of said block copolymer, so as to form a solidified homogeneous membrane of said block copolymer by extruding said hollow fiber extrudate directly into a fluid capable of causing the coagulation of said hollow fiber extrudate.

2. The process of claim 1, wherein said center medium is selected from the group consisting of air and the components of air.

3. The process of claim 1, including drying said coagulated hollow fiber extrudate.

4. The process of claim 1, wherein said hydrophilic polymer is selected from the group consisting of polyvinylpyrrolidone, polyhydroxymethylmethacrylate, polymethacrylic acid, polyethyleneoxide, polyvinylalcohol, polysaccharide, polyimine and mixtures thereof.

5. The process of claim 1, wherein said hydrophobic polymer is selected from the group consisting of polyvinylchloride, polyacrylonitrile, polyethylene, polypropylene, polytetrafluorethylene, polyvinylidenefluoride, polymethylmethacrylate, polycarbonate, polystyrene, polyphenylene, polysulfone, polyimide, polyetherimide, polysiloxane and mixtures thereof.

6. The process of claim 1, wherein said hydrophilic polymer comprises polyethyleneoxide and wherein said hydrophobic polymer comprises polycarbonate.

* * * * *